US012540025B2

United States Patent
Bosetti et al.

(10) Patent No.: US 12,540,025 B2
(45) Date of Patent: Feb. 3, 2026

(54) METHODS FOR PREPARING LIQUID PRODUCTS USING PRESSURIZED EXTRACTION FLUIDS

(71) Applicant: Goglio S.p.A., Milan (IT)

(72) Inventors: Osvaldo Bosetti, Milan (IT); Roberto Galbasini, Milan (IT); Franco Goglio, Milan (IT); Giuseppe Gullo, Milan (IT); Andrea Maccagnan, Milan (IT)

(73) Assignee: GOGLIO S.p.A., Milan (IT)

( * ) Notice: Subject to any disclaimer, the term of this patent is extended or adjusted under 35 U.S.C. 154(b) by 50 days.

(21) Appl. No.: 17/715,821

(22) Filed: Apr. 7, 2022

(65) Prior Publication Data

US 2022/0297928 A1 Sep. 22, 2022

Related U.S. Application Data

(63) Continuation of application No. 16/964,959, filed as application No. PCT/IB2019/050270 on Jan. 14, 2019.

(30) Foreign Application Priority Data

Jan. 30, 2018 (IT) .................. 102018000002185

(51) Int. Cl.
*B65D 85/804* (2006.01)
*B65D 77/22* (2006.01)

(52) U.S. Cl.
CPC ....... *B65D 85/8043* (2013.01); *B65D 77/225* (2013.01)

(58) Field of Classification Search
None
See application file for complete search history.

(56) References Cited

U.S. PATENT DOCUMENTS 2,027,137 A 1/1936 Yeomans
4,743,556 A 5/1988 Ervin
(Continued)

FOREIGN PATENT DOCUMENTS

EP 1775232 A2 4/2007
EP 2631199 A1 8/2013
(Continued)

OTHER PUBLICATIONS

International Search Report and Written Opinion in International Application No. PCT/IB2018/059132 dated Feb. 1, 2019, 13 pages.
(Continued)

*Primary Examiner* — Viren A Thakur
(74) *Attorney, Agent, or Firm* — MH2 TECHNOLOGY LAW GROUP LLP

(57) ABSTRACT

A method for preparing a liquid product from soluble or extractable products using a pressurized extraction fluid in a machine may include: providing a capsule that includes a container body defining a closed chamber housing the soluble or extractable products, an injection lid, a beverage dispensing lid, and a degassing valve; supplying the pressurized extraction fluid through an injection element of the machine; using the pressurized extraction fluid to force the degassing valve to remain in a closed configuration; using the pressurized extraction fluid to open the injection lid and only thereafter to enter the closed chamber; producing a beverage using the pressurized extraction fluid and the soluble or extractable products; and opening the beverage dispensing lid to release the produced beverage from the capsule. The degassing valve may include a valve body having a recess, a membrane inside the recess, and holding means to prevent loss of the membrane.

20 Claims, 6 Drawing Sheets

(56) References Cited

U.S. PATENT DOCUMENTS

| | | | |
|---|---|---|---|
| 4,872,586 A | 10/1989 | Landis | |
| 5,243,164 A | 9/1993 | Erickson et al. | |
| 5,806,703 A | 9/1998 | Grandi | |
| 6,089,271 A | 7/2000 | Tani | |
| 6,663,284 B2 | 12/2003 | Buckingham et al. | |
| 6,959,832 B1 | 11/2005 | Sawada et al. | |
| 8,434,633 B2 | 5/2013 | Beer et al. | |
| 9,657,856 B2 | 5/2017 | Buckingham | |
| 2001/0002270 A1 | 5/2001 | Perry et al. | |
| 2002/0078831 A1 | 6/2002 | Cai | |
| 2004/0000336 A1 | 1/2004 | Goglio | |
| 2006/0096982 A1 | 5/2006 | Gunter et al. | |
| 2006/0110507 A1 | 5/2006 | Yoakim et al. | |
| 2008/0257165 A1 | 10/2008 | Bolzicco et al. | |
| 2009/0289073 A1 | 11/2009 | Moore et al. | |
| 2009/0320692 A1 | 12/2009 | Simanski | |
| 2010/0015307 A1 | 1/2010 | Abegglen et al. | |
| 2010/0180775 A1* | 7/2010 | Kollep | B65D 85/8049 426/77 |
| 2010/0237069 A1 | 9/2010 | Helou, Jr. et al. | |
| 2010/0239717 A1 | 9/2010 | Yoakim et al. | |
| 2010/0260896 A1 | 10/2010 | Yoakim et al. | |
| 2010/0282768 A1 | 11/2010 | Rapparini | |
| 2011/0033580 A1 | 2/2011 | Biesheuvel et al. | |
| 2011/0185910 A1 | 8/2011 | Ryser | |
| 2011/0186450 A1 | 8/2011 | Bonacci | |
| 2011/0274794 A1 | 11/2011 | Gerbaulet et al. | |
| 2012/0097602 A1 | 4/2012 | Tedford | |
| 2012/0225168 A1 | 9/2012 | Kamerbeek et al. | |
| 2012/0298658 A1 | 11/2012 | Bosetti et al. | |
| 2013/0045308 A1* | 2/2013 | Gorbatenko | B65D 85/8061 426/394 |
| 2013/0129872 A1 | 5/2013 | Krüger | |
| 2013/0156897 A1* | 6/2013 | Goldstein | B65D 85/8061 426/115 |
| 2014/0037803 A1 | 2/2014 | Hansen | |
| 2014/0037916 A1 | 2/2014 | Reilly et al. | |
| 2014/0087028 A1 | 3/2014 | Orsi | |
| 2014/0130678 A1* | 5/2014 | Frydman | B65D 85/8061 426/115 |
| 2014/0161936 A1 | 6/2014 | Trombetta et al. | |
| 2014/0205721 A1* | 7/2014 | Orsi | B65D 85/8043 426/115 |
| 2014/0234494 A1 | 8/2014 | Doglioni Majer | |
| 2014/0272018 A1 | 9/2014 | Koller et al. | |
| 2014/0305315 A1 | 10/2014 | Perentes et al. | |
| 2014/0314919 A1 | 10/2014 | Perentes et al. | |
| 2015/0021209 A1 | 1/2015 | Rondelli | |
| 2015/0135967 A1 | 5/2015 | Hoffman et al. | |
| 2015/0166257 A1 | 6/2015 | Trombetta | |
| 2015/0201792 A1 | 7/2015 | Doglioni Majer | |
| 2015/0208852 A1 | 7/2015 | Doglioni Majer | |
| 2015/0251847 A1 | 9/2015 | Talon | |
| 2015/0284156 A1* | 10/2015 | Helmer | B65D 51/1616 220/203.18 |
| 2015/0336736 A1 | 11/2015 | Cabilli | |
| 2015/0344285 A1 | 12/2015 | Joseph | |
| 2015/0353274 A1 | 12/2015 | Bisio | |
| 2015/0359586 A1 | 12/2015 | Heggeness | |
| 2016/0037961 A1 | 2/2016 | Digiuni | |
| 2016/0039601 A1 | 2/2016 | Doglioni Majer | |
| 2016/0075506 A1 | 3/2016 | Chapman et al. | |
| 2016/0159563 A1 | 6/2016 | Bartoli et al. | |
| 2016/0176625 A1 | 6/2016 | Brockman et al. | |
| 2016/0207697 A1 | 7/2016 | La Gamba et al. | |
| 2016/0214787 A1 | 7/2016 | Iotti | |
| 2016/0264332 A1 | 9/2016 | Rapparini et al. | |
| 2016/0280455 A1 | 9/2016 | Miller et al. | |
| 2016/0288988 A1 | 10/2016 | Roberts et al. | |
| 2016/0318689 A1 | 11/2016 | Rudick et al. | |
| 2016/0325862 A1 | 11/2016 | Deuber et al. | |
| 2016/0325924 A1 | 11/2016 | Van Der Veen | |
| 2016/0332805 A1 | 11/2016 | Krupa et al. | |
| 2016/0362247 A1 | 12/2016 | Bartoli et al. | |
| 2017/0107034 A1 | 4/2017 | Okamoto et al. | |
| 2017/0158422 A1 | 6/2017 | Andreae et al. | |
| 2017/0190451 A1 | 7/2017 | Van Der Vliet et al. | |
| 2017/0247179 A1 | 8/2017 | Rubinstein | |
| 2017/0363800 A1 | 12/2017 | Liu et al. | |
| 2018/0148251 A1 | 5/2018 | Kay | |
| 2018/0178972 A1 | 6/2018 | Mondillon et al. | |
| 2018/0228314 A1 | 8/2018 | Putnam | |
| 2018/0273286 A1 | 9/2018 | Dijkstra et al. | |
| 2018/0305073 A1 | 10/2018 | Moffitt et al. | |
| 2018/0319072 A1 | 11/2018 | Bergner | |
| 2019/0062998 A1 | 2/2019 | Chen et al. | |
| 2019/0084757 A1 | 3/2019 | Brysch et al. | |
| 2019/0084759 A1 | 3/2019 | Tung et al. | |
| 2019/0150657 A1 | 5/2019 | García Ríos | |
| 2019/0177069 A1 | 6/2019 | Buckingham et al. | |
| 2019/0225411 A1 | 7/2019 | Gerbaulet et al. | |
| 2020/0216256 A1 | 7/2020 | Miozzo et al. | |
| 2020/0377291 A1 | 12/2020 | Bosetti et al. | |
| 2021/0039863 A1 | 2/2021 | Bosetti et al. | |
| 2021/0107731 A1 | 4/2021 | Bosetti et al. | |
| 2022/0297928 A1 | 9/2022 | Bosetti et al. | |

FOREIGN PATENT DOCUMENTS

| | | | | |
|---|---|---|---|---|
| EP | 2690035 | A1 | 1/2014 | |
| EP | 2851316 | A2 * | 3/2015 | ......... B65D 85/8043 |
| EP | 2998242 | A1 | 3/2016 | |
| EP | 3085642 | A2 | 10/2016 | |
| GB | 2537764 | A * | 10/2016 | ......... B65D 85/8043 |
| GB | 2538399 | A | 11/2016 | |
| GB | 2538399 | A8 | 11/2016 | |
| JP | H05124656 | A | 5/1993 | |
| WO | 2010/137952 | A1 | 12/2010 | |
| WO | 2013/060918 | A1 | 5/2013 | |
| WO | 2014/012783 | A2 | 1/2014 | |
| WO | 2014/012783 | A3 | 1/2014 | |
| WO | 2014/097039 | A1 | 6/2014 | |
| WO | 2014/118812 | A1 | 8/2014 | |
| WO | 2014/128315 | A1 | 8/2014 | |
| WO | 2015/128827 | A1 | 9/2015 | |
| WO | 2016/186496 | A1 | 11/2016 | |
| WO | 2017/098349 | A1 | 6/2017 | |

OTHER PUBLICATIONS

International Preliminary Report on Patentability in International Application No. PCT/IB2018/059132 dated Jul. 15, 2019, 7 pages.

International Search Report and Written Opinion in corresponding International Application No. PCT/IB2019/050270, mailed May 13, 2019, 11 pages.

International Preliminary Report on Patentability in corresponding International Application No. PCT/IB2019/050270 mailed May 26, 2020, 6 pages.

International Search Report and Written Opinion in International Application No. PCT/IB2019/052692, mailed on Jun. 6, 2019, 12 pages.

International Preliminary Report on Patentability in International Application No. PCT/IB2019/052692 dated Oct. 13, 2020, 6 pages.

Bower, A. "Applied Mechanics of Solids," "Appendix A: Vectors and Matrices," <http://solidmechanics.org/text/AppendixA/AppendixA.htm> dated 2008, 23 pages (accessed Apr. 27, 2023).

"Why taking components of a component of a vector is invalid?" <https://physics.stackexchange.com/questions/176200/why-taking-components-of-a-component-of-a-vector-is-invalid > dated Apr. 15, 2015, 4 pages (accessed Apr. 27, 2023).

* cited by examiner

METHODS FOR PREPARING LIQUID PRODUCTS USING PRESSURIZED EXTRACTION FLUIDS

CROSS-REFERENCE TO RELATED APPLICATION(S)

This application is a continuation application of U.S. patent application Ser. No. 16/964,959 ("the '959 application"), filed on Jul. 24, 2020, in the U.S. Patent and Trademark Office ("USPTO"), and published as U.S. Patent Publication No. 2021/0039863 A1 on Feb. 11, 2021. The '959 application was a national stage entry from International Application No. PCT/IB2019/050270 ("the '270 application"), filed on Jan. 14, 2019, in the Receiving Office ("RO/IB") of the International Bureau of the World Intellectual Property Organization ("WIPO"), and published as International Publication No. WO 2019/150205 A1 on Aug. 8, 2019. The '270 application claimed priority under 35 U.S.C. § 119 from Italian Patent Application No. 102018000002185, filed on Jan. 30, 2018, in the Italian Patent and Trademark Office ("IPTO"). The entire contents of all of these applications are incorporated herein by reference.

DESCRIPTION

Field of the Invention

The present invention relates to a capsule with degassing valve.

In particular, the present invention relates to a capsule (also called cartridge or pod) for the preparation of a liquid product, starting from soluble products that can be extracted by means of a machine supplying a high-temperature extraction fluid (and/or steam). This capsule is provided with a degassing valve suitable for degassing the gases released by these soluble products during storage (i.e., before using the capsule in the machine).

More particularly, the present invention relates to a capsule provided with a degassing valve in which the soluble product is fresh coffee.

State of the Art

Dispensable capsules are known to be used with suitable machines for the preparation of beverages.

Such capsules usually comprise a container body, which defines a closed chamber for housing the soluble or extractable product. The container body has a first base and a second base and a side wall, which extends along a longitudinal direction X-X between the first base and the second base.

In particular, both the second base and the first base are closed by a lid (also called membrane or sealing sheet) and, depending on the type of machines used, one or both lids can be made of plastic materials, aluminium, paper or a combination thereof.

In order to proceed with the extraction of the beverage, the lid or lids can be pierced by machine piercing tips, which in turn can also be configured to feed the extraction fluid into the closed chamber of the capsule.

The soluble or extractable product usually consists of a dehydrated substance for the preparation of a beverage; examples of dehydrated substances are ground coffee, instant coffee, a mixture of ground coffee and instant coffee or any other dehydrated edible substance.

It is also provided that the substance contained in the capsule may be a soluble degassing product, such as fresh coffee or other food or non-food substances subject to degassing.

However, as already known, fresh coffee produces gas (such as $CO_2$), which in the closed chamber of the capsule can lead to such a pressure increase to break the lid or lids of the capsule.

In this case, the capsule is no longer airtight and coffee degradation occurs.

This makes it impossible to use the capsule for the preparation of the liquid product. To overcome this problem, it is known to use a degassing valve for degassing the gases formed inside the chamber and at the same time preventing any air from entering the closed chamber.

EP3085642 discloses a capsule provided with a degassing valve that is glued to the lid of the upper base.

In particular, EP3085642 teaches that the valve adheres to the lid of the upper base so that the gases can escape from the chamber through the valve and flow out of the capsule.

At the time of the beverage production, the upper lid and the degassing valve are pierced by piercing tips supplying the pressurized extraction fluid into the chamber.

Problem of the State of the Art

However, such a capsule, although functional, is not free from problems, among which there is precisely the one of having arranged the degassing valve on the upper lid.

In fact, this arrangement implies that the piercing tips must pierce the degassing valve as well as the lid, with an increase in the force value necessary to perform the operation.

This implies that the machine manufacturers must provide suitable mechanisms for increasing the force transmitted to the tips to effectively use such a capsule.

A further disadvantage consists in the fact that having the valve arranged in the lid intended for closing the upper base involves an increase in the overall thickness of the lid, which also causes a greater wear of the piercing tips and therefore, in the long run, a less effective piercing of the lid.

Furthermore, having arranged the degassing valve on the lid of the upper base limits the possibility of use of the capsule. In fact, if the machine provides that the extraction fluid is supplied through the lid of the lower base, it is clear that the presence of the degassing valve on the lid of the upper base, besides increasing the thickness of the lid, also tends not to facilitate the passage of the beverage, since the same degassing valve contrasts the opening of the lid associated to the upper base. Finally, having arranged the degassing valve on the lid of the upper base exposes the valve to possible, even accidental damage, not visible to the naked eye but which otherwise affect the correct operation of the valve and therefore do not ensure the preservation of the coffee freshness as well as its organoleptic characteristics.

Object of the Present Invention

The object of the present invention is to find a capsule containing degassing products that are able to solve the aforesaid problems of the prior art.

This object is achieved by means of a capsule for use in a standard commercially available machine for the preparation of beverages starting from soluble or extractable products by means of a pressurized extraction fluid according to the following claims.

Advantages of the Present Invention

Thanks to various embodiments of the present invention, it is possible to provide a capsule that can offer separately or in combination one or more of the following advantages:
- avoiding the wear of the piercing tips;
- maintaining the thicknesses of the lids within values that do not require the use of modified machines to pierce thicker lids;
- possible making of the body of the capsule, the lids and/or the cartridge as a whole with compostable and oxygen barrier material without giving rise to functional problems;
- possible use in machines provided with piercing tips designed to pierce the bottom wall of the capsule without the bottom wall being actually pierced by said tips;
- avoiding any damaging and/or tampering, even accidental, of the valve of the capsule during the transport, storage and/or use of the capsule.

DETAILED DESCRIPTION

Figure 1A:
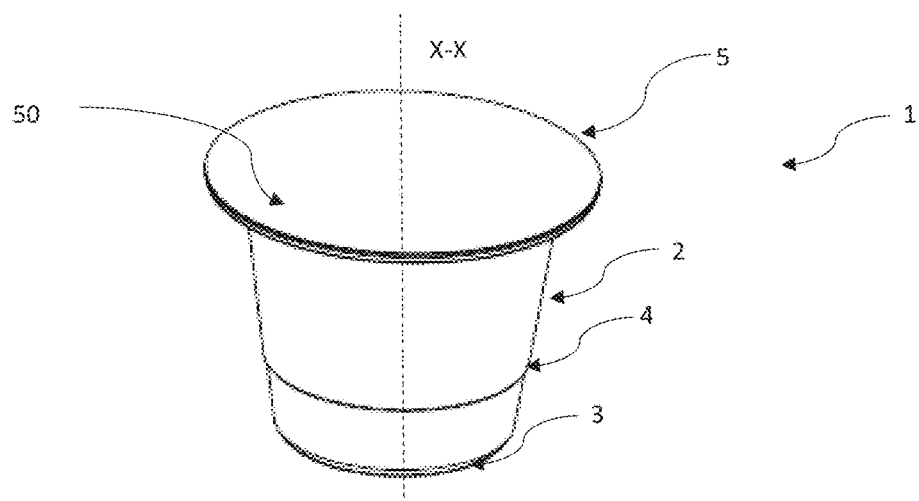
FIGS. 1A and 1B show a first embodiment of the capsule according to the present invention in a perspective view from above and in a perspective view from below, respectively.
Figure 1B:
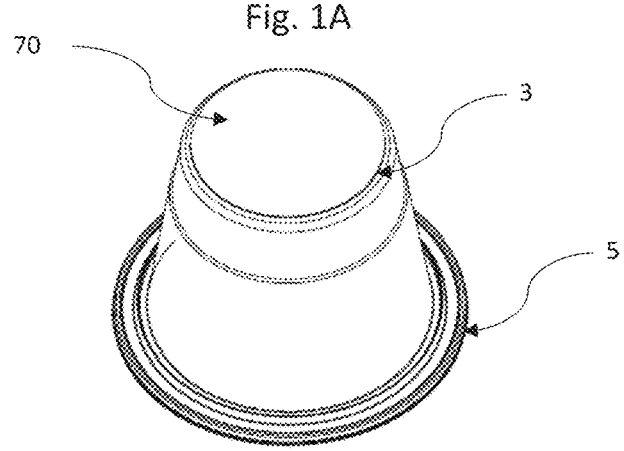

Even if not explicitly highlighted, the individual characteristics described with reference to the specific embodiments must be meant as auxiliary and/or interchangeable with other characteristics described with reference to other embodiments.

In the following it is described the structure and the advantages of a capsule 1 (or cartridge or pod, these terms being equivalently used here) for the preparation of soluble or extractable products by means of a pressurized extraction fluid supplied by a machine known in the art and therefore not further described.

In various embodiments, the liquid product at issue may consist of a beverage such as, for example, coffee obtained by introducing into the cartridge pressurized and heated (i.e. hot) liquid and/or steam.

In various embodiments, the capsule 1 may contain a soluble or extractable product of a substance (not shown in the figures) capable of forming the liquid product by means of the aforementioned liquid and/or steam. This soluble or extractable product of a substance may consist of coffee powder or of another precursor of a liquid product like a beverage such as tea, chocolate in powder or grains, products for preparing broths, soups, soft drinks and infusions of various kinds, this list being meant as exemplary and not exhaustive.

In a preferred form of use, the soluble product contained in the capsule is a product degassing during storage, i.e. a product that releases gas.

Even more preferably, the soluble product contained in the capsule is fresh coffee, specifically freshly ground coffee powder.

The attached figures represent various views of the capsule 1, which comprises:
- a container body 2, shaped like a small bowl or small cup, which defines a closed chamber 21 for housing the soluble or extractable product,
- a first base 3,
- a second base 5 and
- a side wall 4 extending along a longitudinal direction X-X between the first base 3 and the second base 5.

It should be noted that the container body 2 of the capsule 1 is preferably made of compostable or biodegradable material, where biodegradable means the ability of organic substances and materials to be degraded into simpler molecules by means of a series of irreversible chemical reactions. The level of biodegradation to be achieved to be included in the certification of biodegradable material is at least 90% to be obtained in no more than 6 months.

Preferably, the container body 2 of the capsule 1 is made of biodegradable materials selected from the group comprising cornstarch, potato starch, cellulose, biodegradable and compostable plastics known under the trade name of Mater-Bi and/or any combination of the aforementioned materials.

In particular, the container body 2 of the capsule 1 is preferably made of a compostable material, for example a compostable material based on Polyesters/PLAs/resins derived from starches and the like.

In various embodiments, as shown in the appended Figures, the body 2 can have a divergent tub conformation starting from the first base 3 towards the second base 5.

In various embodiments, the divergent conformation may be a frustoconical conformation. In this latter example, the one preferred for making the capsule 1, the term first base 3 means the base having a diameter smaller than the one of the second base 5 of the capsule 1, which has a larger diameter.

This preferred embodiment is not however imperative, since the capsule 1 can have as a whole different shapes, e.g. a prismatic, truncated-pyramidal, square shape, etc. As shown in the accompanying figures, the capsule 1 comprises an injection lid 30, designed to be opened to allow supplying the extraction fluid into the chamber, and a beverage dispensing lid 50, designed to be opened to release a beverage prepared from the soluble product and from the fluid.

In the present description, the term lid means a closing element of the container body of a capsule to contain the soluble or extractable product inside the container body of the capsule and to prevent the entry of liquids and solid external agents inside the container body of the capsule.

According to a preferred aspect, both the injection lid 30 and the beverage dispensing lid 50 are of the compostable and of the oxygen barrier type.

The term barrier lid means a closing element having physical and chemical resistance properties, e.g. to oxygen or water or gases or aromas, or a combination of the foregoing.

The term compostable barrier lid means a closing element that, besides the aforementioned characteristics, also complies with the compostability requirements of the current regulations.

Preferably, the injection lid 30 is closingly associated to the first base 3, whereas the beverage dispensing lid 50 is closingly associated to the second base 5.

The association of the lids 30, 50 to the respective bases takes place by means of a sealing operation, as described in the following.

According to a preferred embodiment, it is provided that:
the injection lid 30 comprises at least one barrier layer, which in turn comprises a compostable barrier film and an oxygen barrier layer; this injection lid 30 has a predetermined thickness, which is comprised between the smallest thickness obtainable by this specific technology up to a maximum of 200 μm, showing an elastic modulus ranging from 100 to 5,000 MPa;
the beverage dispensing lid 50 comprises at least a first barrier layer, which in turn comprises a compostable barrier film and an oxygen barrier layer and has a thickness comprised between 20 and 200 μm.

The embodiments of the lids 30 and 50 advantageously allow obtaining oxygen barrier values lower than 10 $cc/m^2/day/atm$ at 0% relative humidity (RH), at 23° C.

With a particular reference to FIGS. 2 to 5, the capsule 1 comprises a degassing valve 6 that has the purpose of evacuating the gases released by the product contained in the chamber 21 outside the capsule 1. According to a preferred aspect, the degassing valve 6 is made of compostable material.

Figure 4A:
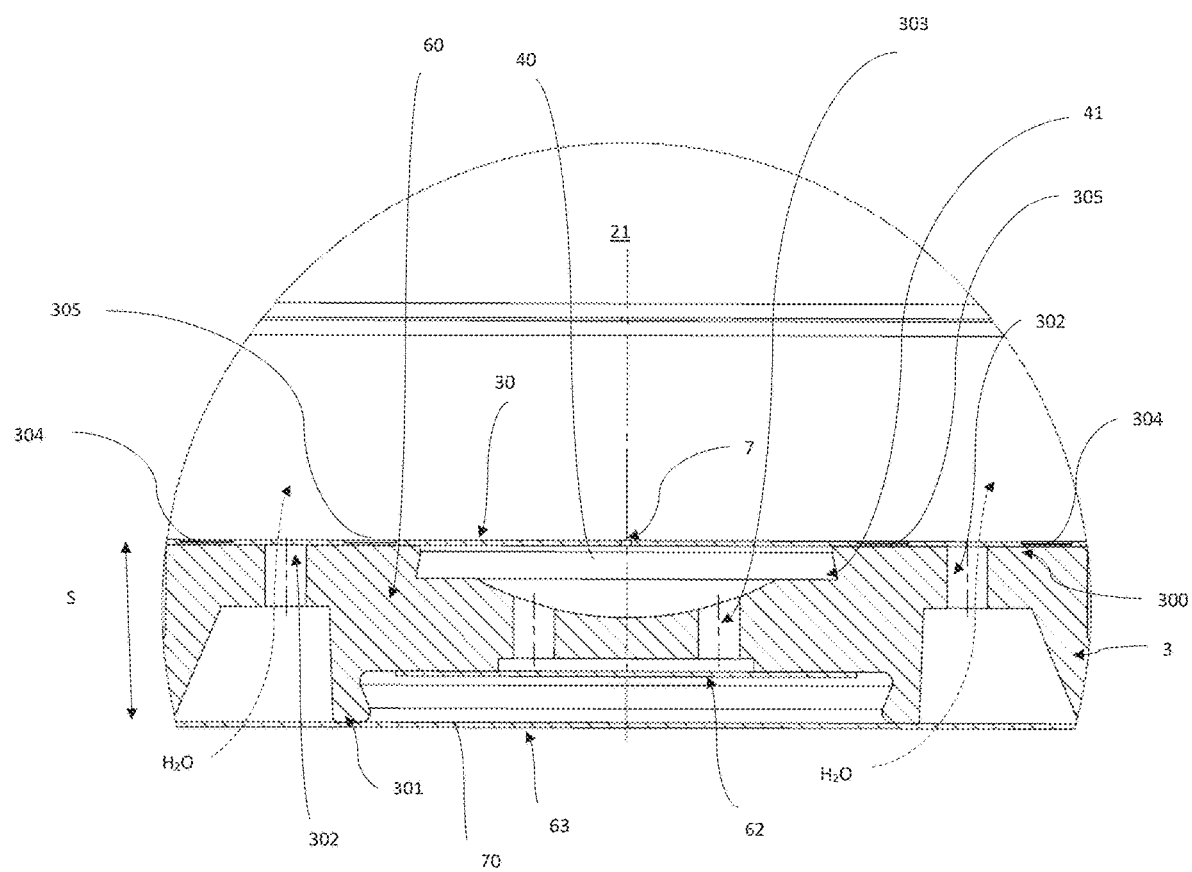
FIG. 4A shows an enlarged view of a portion of the capsule of FIG. 3 in a first operating condition.

In particular, the degassing valve 6 is actuated, in its open configuration, by the gases released by the soluble or extractable product (FIG. 4B) and, in its closed configuration, is actuated by the pressurized fluid supplied by the machine (FIG. 4A).

To this end, in order to make a capsule 1 that is capable of releasing out of the capsule 1 the gases generated by the soluble product and so that the capsule 1 can be used with standard machines, it is advantageously provided that said degassing valve 6 is arranged close to the container body 2 and is configured to be in fluid communication with the closed chamber 21 through at least one notch 7 formed in the injection lid 30, wherein the pressurized fluid supplied by the machine is able to enter the closed chamber 21 only after opening the injection lid 30.

This arrangement of the valve 6 with respect to the container body 2 advantageously allows avoiding the wear of the piercing tips of the machines, since the valve 6 is not arranged on the lid designed to close the second base 5 and above all allows keeping the thicknesses of the lids 30 and 50 within values that do not require the use of modified machines to pierce thicker lids.

In other words, the degassing valve 6 is arranged near the first base 3, the second base 5 and/or the side wall 4, i.e. the elements that make up the container body 2. Therefore, the degassing valve 6 is not arranged near the lid 30 and/or the lid 50. According to one aspect, the notch 7 comprises one or more notches having a suitable shape and/or size and formed in the thickness of the injection lid 30. The passage of the gases generated by the soluble product through said notches is allowed, whereas it is substantially avoided any passage of the soluble product. According to one aspect in which the valve 6 is in fluid communication with the closed chamber 21 through the notch 7 formed in the injection lid 30 and is insulated from the outside when in its closed configuration, the lid 30 is arranged behind the valve 6 when looking at the capsule 1 from the outside.

In other words, the lid 30 is directly facing the closed chamber 21, namely is in direct contact with the soluble product contained in the closed chamber 21.

In the embodiment shown in the accompanying figures, the capsule 1 provides the use of a single valve 6 but nothing forbids having also two or more valves 6 if the specific application imposes it. For example, it can be provided that a valve 6 is arranged near the base 3 and another one near the side wall 4.

In one embodiment of the present invention, the degassing valve 6 is integrated in the thickness of the container body 2, i.e. in the thickness of the first base 3 and/or in the thickness of the side wall 4. In other words, the degassing valve 6 is made of a piece or is integrated in the thickness of the first base 3 and/or in the thickness of the side wall 4.

The making of the valve 6 within the thickness of the base 3 and/or of the side wall has the advantage of preventing any damage and/or tampering, even accidental, of the valve 6 since it is inserted in the thickness of the base 3 and/or of the side wall 4. According to a preferred embodiment, which will be described hereinafter, the first base 3, namely the one having the smaller diameter in the case of a frustoconical conformation of the capsule 1, is shaped to house the degassing valve 6 in its thickness S (see in particular FIGS. 4A, 4B and 5).

To this end, also with reference to the annexed figures, various embodiments may refer to the fact that the first base 3 has:
an inner surface 300 facing the closed chamber 21 and
an outer surface 301 facing the outside of the capsule 1.

Figure 2:
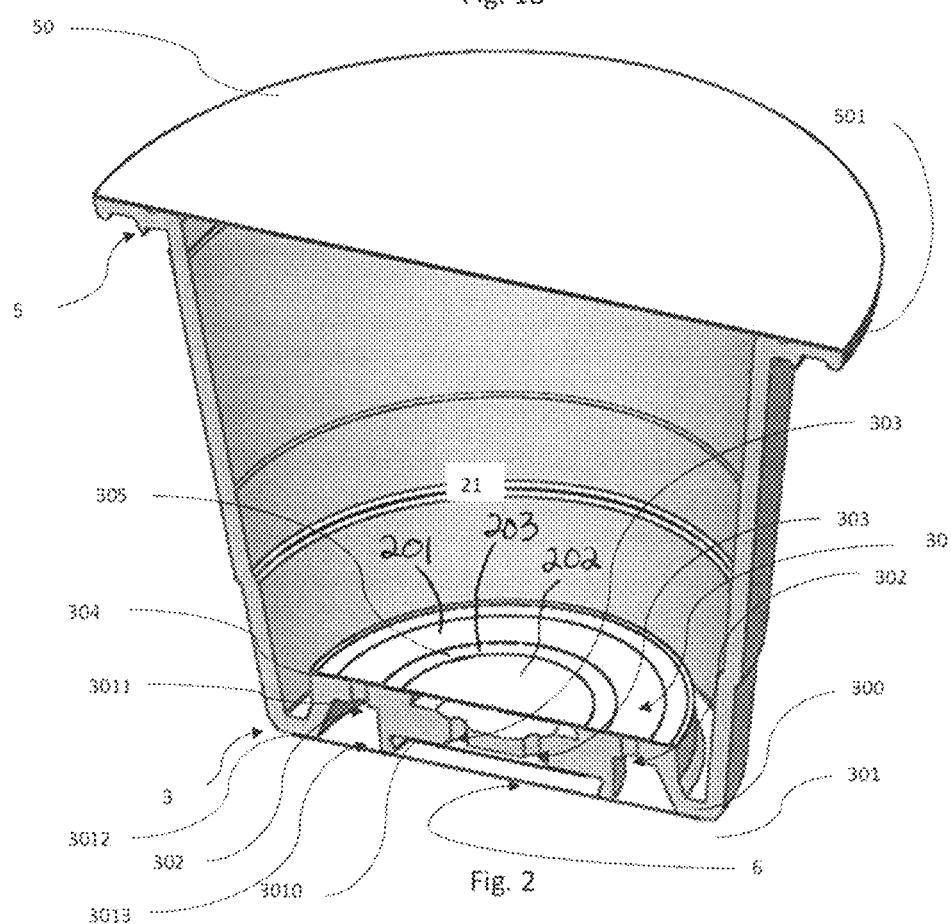
FIG. 2 shows a perspective view in section along the line II-II of the capsule of FIG. 1D.
Figure 3:
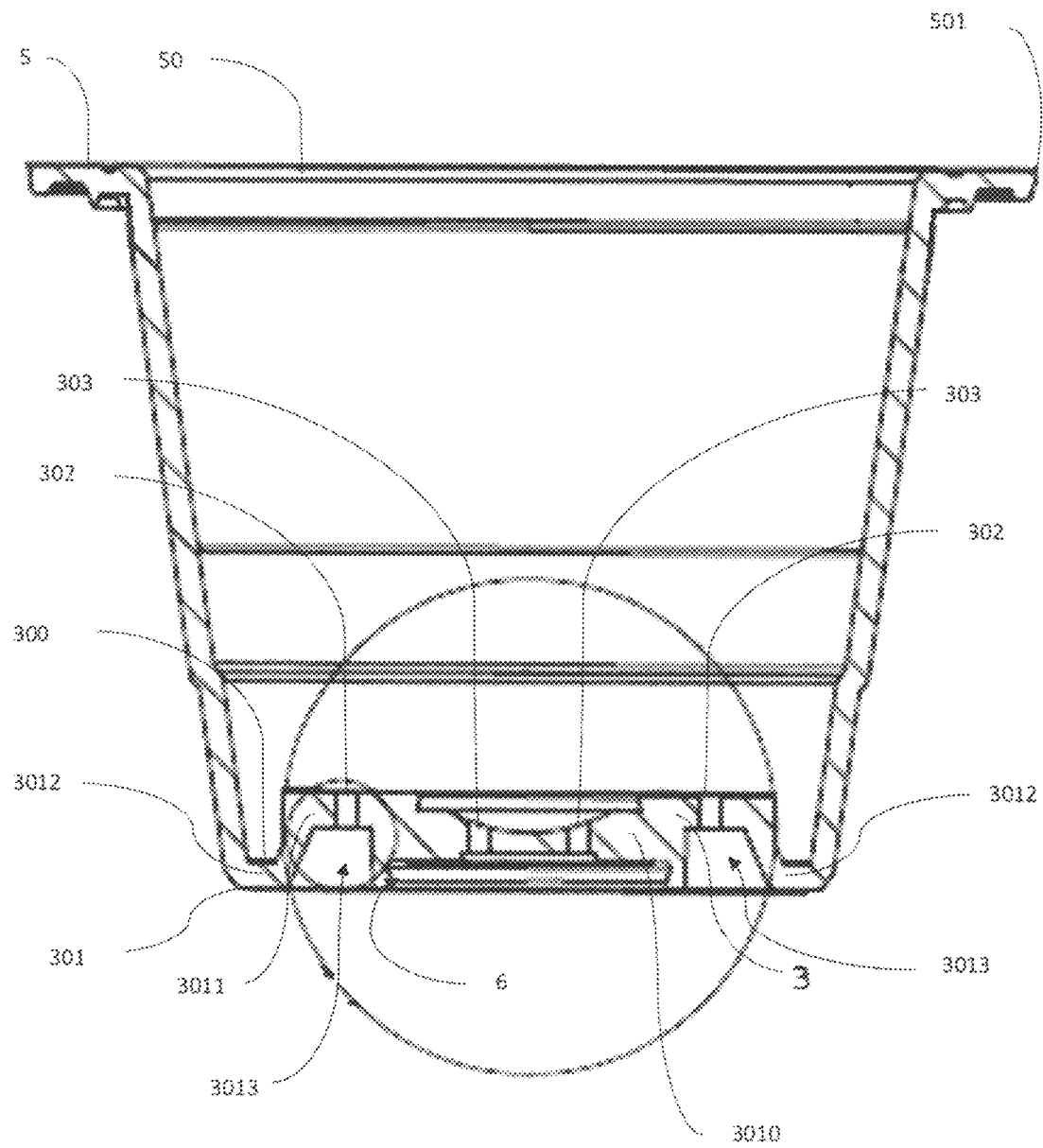
FIG. 3 shows a side section view along the line II-II of the capsule of FIG. 1D.

The first base 3, also with reference to FIGS. 2 and 3, comprises first openings 302 for the passage of the extraction fluid from the outer surface 301 to the inner surface 300 of the first base 3 (i.e., the one with a smaller diameter) as well as second openings 303 for the passage of the gases generated by the soluble product contained in the closed chamber 21.

Figure 4B:
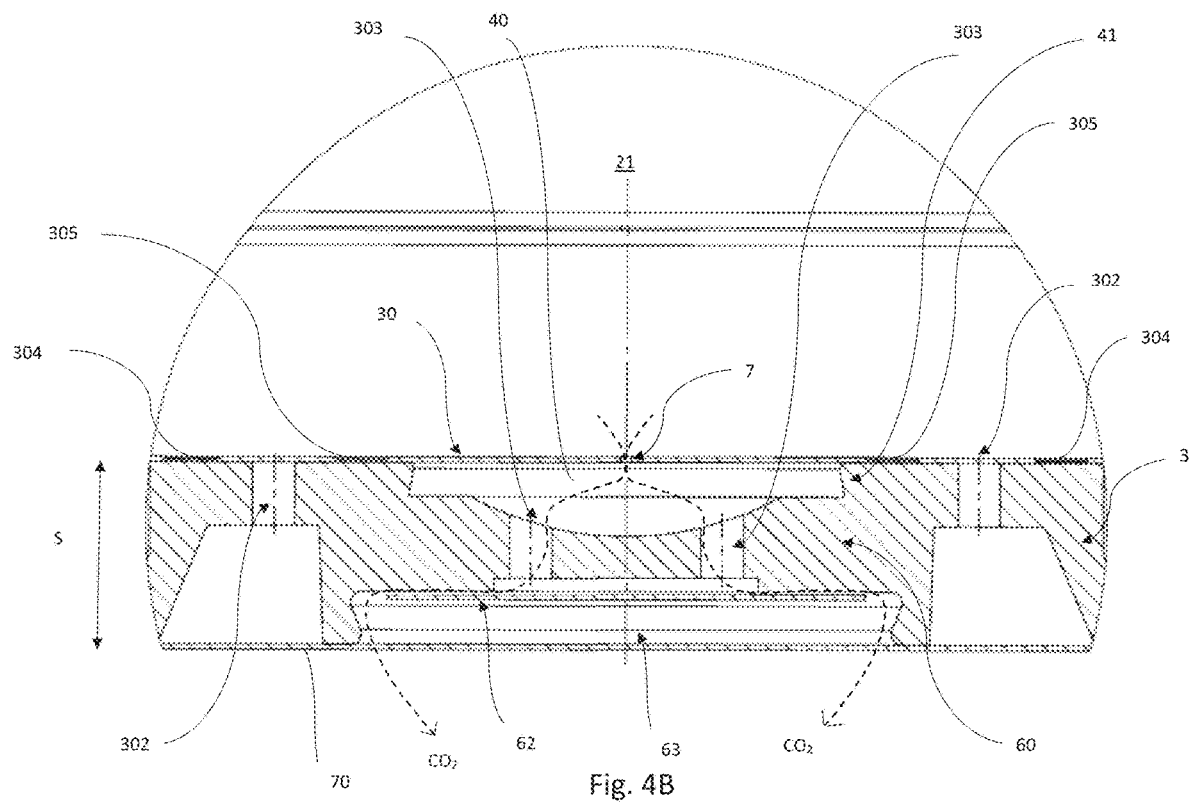
FIG. 4B shows an enlarged view of a portion of the capsule of FIG. 3 in a second operating condition.

Therefore:
when there is a pressure increase inside the chamber 21 due to the gases released by the soluble product (for example $CO_2$ in the case of fresh coffee), the degassing valve 6 is activated in its open configuration by the gases to allow them to flow out of the capsule 1 through the notch 7 provided in the injection lid 30 and through the openings 303. The path followed by the gas released by the product from the chamber 21 to the outside of the capsule 1 is shown in FIG. 4B with the dashed line;
when the capsule 1 is used for the preparation of the beverage, the extraction fluid (e.g. $H_2O$ water) opens the injection lid 30, thus entering the closed chamber 21 through the openings 302. In particular, the extraction fluid acts on the degassing valve 6 to keep it in its closed configuration, thus preventing the entry through the valve of the extraction fluids as well as the outflow of the beverage during its preparation and dispensing, since the extraction fluid also entering through the openings 303 forces the valve to remain closed. The path followed by the extraction fluid (for example $H_2O$ water) supplied by the machine is shown in FIG. 4A with the dashed arrows;
when the optimal mixture is obtained, the beverage is extracted through the lid 50, which can be engraved by punches belonging to the machine.

As shown, advantageously, the presence of the degassing valve 6 does not involve any dimensional variation (not even in the thickness S of the first base 3) if compared to a capsule known in the state of the art of the beverage production, since the presence of the degassing valve 6 does not affect the way in which the extraction fluid is supplied and how the beverage is produced, as well as its extraction.

This guarantees the use of the capsule 1 also in machines already available on the market without having to modify them, and above all the capsule 1 does not provide any thickness increase of the lid 30, 50 or of the side wall 4.

According to one aspect, the first openings 302 and the second openings 303 are made up of a plurality of through holes having any shape, preferably with a circular cross-section.

In particular, the plurality of holes of the first openings 302 have a total opening surface comprised between 1 $mm^2$ and 8 $mm^2$, preferably equal to 4 $mm^2$, whereas the plurality of holes of the second openings 303 have a total opening surface comprised between 0.5 $mm^2$ and 3 $mm^2$, preferably equal to 1.5 $mm^2$.

According to one aspect, the number of holes in the first openings is eight, while the number of holes in the second openings is two.

Figure 1C:
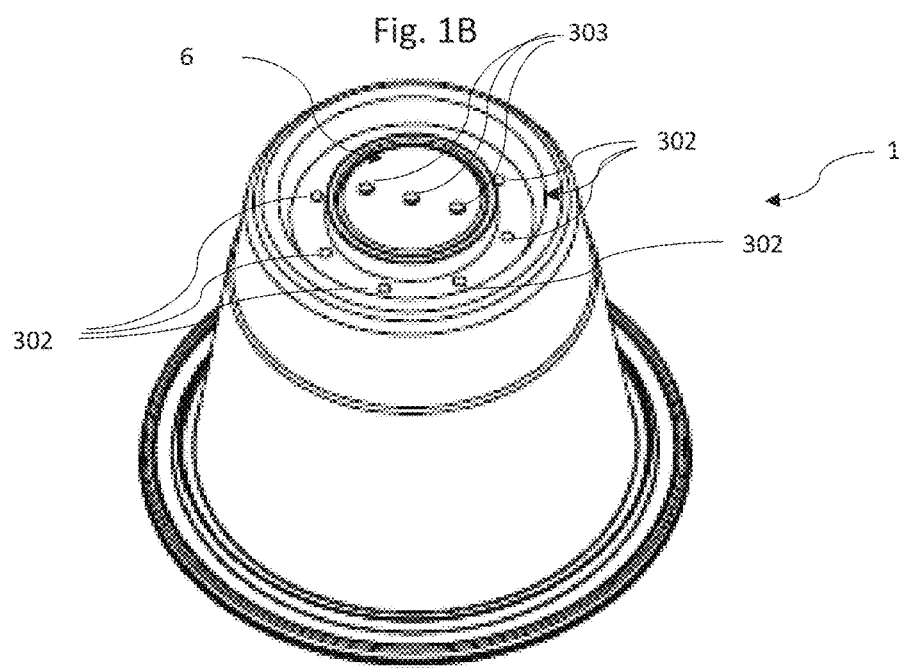
FIG. 1C shows the capsule of FIGS. 1A and 1B in a perspective view from below but without a covering lid.
Figure 1D:
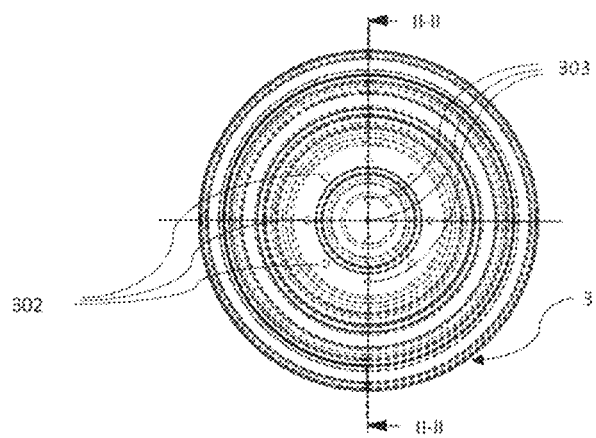
FIG. 1D shows a plan view of the capsule of FIG. 1A or 1B.

In a preferred embodiment, also with reference to FIGS. 1C and 1D, the holes of the first openings 302 are arranged in a circular crown, while the holes of the second openings 303 are arranged along a straight line.

This arrangement of the holes of the first and second openings 302 and 303 is advantageous in that it allows the extraction fluid to evenly enter through the holes 302 after having opened the lid 30 in the closed chamber 21, so as to invest the soluble product homogeneously, while allowing the gases to exit from the holes 303, thus concentrating in a specific area and avoiding any dispersion.

In particular, the diameter of the circular crown of the first openings 302 is such to contain also the holes of the second openings 303 within the hypothetical area identified by the circular crown.

According to a preferred aspect, the notch 7 is provided in the centre of the circular crown of the first openings.

According to one aspect, also with reference to FIGS. 2 and 4A-4B, the injection lid 30 is sealingly associated to the inner surface 300 of the first base 3 by means of a first sealing region 304 and of a second sealing region 305.

In particular, thanks to said two sealing regions 304, 305, the first openings 302 are sealed so as to avoid any entry of air through the openings 302 during the storage of the capsule 1.

The sealing regions 304 and 305 are preferably obtained by heat sealing or by other known techniques such as e.g. those with ultrasounds or adhesive materials.

According to one aspect, the injection lid 30 comprises a peripheral portion extending beyond the openings 302 of the first base 3 and is designed to sealingly close said openings 302 (i.e., without there being any air and/or gas passage). The outer portion of the injection lid 30 corresponding to this peripheral portion may be identified as first area 201 (e.g., FIG. 2).

Preferably, this injection lid 30 is a seamless material, namely there are no discontinuities in its surface or thickness (i.e., it is not porous), except for the notch or notches 7 provided for the passage of gases through degassing valve 6.

According to one aspect, the injection lid 30 is disc-shaped and can be made of a material that is heat-shrunk, torn, pierced, dissolved when the pressurized extraction fluid is supplied through the injection element of the machine.

In a preferred embodiment, the injection lid 30 is a lid, which is not heat-shrinking, which does not tear or dissolve in contact with the extraction fluid but raises with respect to the inner surface 300 of the first base 3.

For this purpose, the sealing region 304, in use, is capable of yielding at least in a portion thereof to the pressure of the extraction fluid passing through the openings 302. In other words, the sealing region 304 yields under the action of the hydraulic pressure exerted by the extraction fluid, i.e. the average tension of the injection lid 30 is higher than the one of the portions of the sealing region 304, which yields under the action of the hydraulic pressure. According to one aspect, the yielding sealing region 304 is only a portion of the whole sealing region. This is due to the fact that as soon as a portion of the sealing region 304 yields, then the extraction fluid passing through the gap formed between the second lid 30 and the yielding sealing region 304 decreases its pressure, leaving unchanged the non-yielding remaining part of the sealing region 304. In particular, the pressure of the extraction fluid determines the detachment of the sealing region 304 from the second side of the annular portion 3011 of the first base 3 for at least a part of the peripheral region of the second compostable barrier lid 30 and is variable between 0.5 bar and 15 bar.

Optionally, when the capsule 1 is in use in the machine containment chamber, also the second sealing region 305 may be a seal yielding at least in a portion thereof under the pressure of the extraction fluid passing through said openings 302 so that the injection lid 30 rises with respect to the surface 300 of the first base 3.

As shown in FIG. 2, the first sealing region 304 and the second sealing region 305 are shaped like a circular crown, in which the first sealing region 304 has a diameter larger than the diameter of the circular crown representative of the first openings 302 and the second sealing region 305 has a diameter larger than the diameter of the circular crown representative of said second openings 303, but smaller than the one of the first openings 302. The inner portion of the injection lid 30 corresponding to a diameter smaller than the diameter of the second sealing region 305 may be identified as second area 202 (e.g., FIG. 2), while the intermediate portion of the injection lid 30 corresponding to the second sealing region 305 may be identified as third area 203 (e.g., FIG. 2).

The beverage dispensing lid 50 is sealingly associated to the second base 5, i.e. it provides an airtight seal.

According to a preferred embodiment, the second base 5 defines an annular edge 501 and the beverage dispensing lid 50 is sealingly associated to the annular edge 501 by means of a sealing region (not shown in the figures).

The sealing region is preferably obtained by heat sealing or by other known techniques, such as for example those with ultrasounds or adhesive materials.

The beverage dispensing lid 50 also advantageously has an ability of being pierced or torn and/or a thickness such as to allow the pressurized opening of the extraction liquid.

According to one aspect, the beverage dispensing lid 50 is disc-shaped and is, for example, free of notches, i.e. it has no yielding areas, but nevertheless comes into contact with the mechanism of the apparatus intended to supply the pressurized extraction fluid according to known and therefore not described techniques.

According to one aspect, as shown in FIGS. 2 and 3, the first base 3 can have a sculpted structure, namely with respectively raised and recessed parts.

In particular when observed from the outside, the first base 3 comprises:

a central portion 3010;

an annular portion 3011 surrounding the central portion 3010, the annular portion 3011 being configured to be recessed relative to the central portion 3010, the first openings 302 being provided in the annular portion 3011 and the second openings 303 being provided in said central portion 3010, and wherein the notch 7 is provided in an area of injection lid 30 that corresponds to said central portion 3010.

According to one aspect, the first sealing region 304 and the second sealing region 305 are provided in the annular portion 3011, namely in the surface facing the closed chamber 21 so that the injection lid 30 is arranged inside the closed chamber 21 in direct contact with soluble or extractable products.

It should also be noted that in the recessed area 3013 facing the outside of the capsule, the tips of the machine can be inserted without thereby contacting the injection lid 30.

As shown in FIGS. 2 and 3, the annular portion 3011 is preferably connected to the side wall 4 of the capsule 1 by means of a portion 3012 having a preferably straight line, which acts as a support for the capsule 1 when it is arranged on a support plane.

According to a characteristic aspect of the present description, the degassing valve 6 comprises:

a valve body 60 formed in a piece in the thickness S of the first base 3;

a membrane 62, movable with respect to said body 60 between a first operating condition (open), which allows the passage of the gases from the closed chamber 21 to the outside (FIG. 4B), and a second operating condition (closed), which prevents the passage of the gases from the closed chamber 21 to the outside and also prevents the entry of the extraction fluid into the closed chamber 21 (FIG. 4A), said first operating condition being allowed when reaching a predetermined gas threshold value; and holding means 63 to prevent the loss of the movable membrane 62.

In other words, the degassing valve 6 is a mono-directional type valve that is normally closed, preventing the release of the gases contained in the chamber 21, opens when the chamber 21 has a pressure value higher than a threshold value, allowing the gas to leave the chamber 21, and closes again when the pressure value inside the chamber 21 returns below the threshold value, preserving the characteristics of the soluble product.

According to one aspect, the movable membrane 62 is arranged close to the second openings 303 so as to close them/open them based on the expulsion requirements of the gases developed in the closed chamber 21. For this purpose, the membrane 62 has a sufficient surface size to cover the second openings 303.

In order to allow the passage between the two operating positions of the membrane 62, use is made of preferably biodegradable oil, such as e.g. coffee oil, which acts as a sealant between the valve body 60 and the membrane 62.

It should be noted that during the supplying phase of the extraction fluid, such fluid passing through the openings 303 forces the membrane 62 to remain closed by pushing it against the valve body 60, thus avoiding any leakage of the beverage from the chamber 21 during its preparation and dispensing.

The thickness of the movable membrane 62 is not less than 20 μm and can be made of materials such as PLA or polyester.

In the embodiment of the degassing valve 6 shown in FIGS. 4A and 4B, the holding means 63 ensuring that the movable membrane 62 cannot get lost comprises a protection element 70, which is associated to the outer surface 301 (i.e., that surface facing out of the capsule 1).

The protection element 70 is arranged at the movable membrane 62 of the degassing valve 6 and is configured to protect this movable membrane 62 from agents external to the capsule.

This protection element 70 is embodied in a disc-shaped element, which is associated to the surface 301 of the first base 3 in order to completely cover it, namely to cover its whole surface. The adhesion of the protection element 70 to the surface 301 of the first base 3 takes place by means of a heat sealing or by other known techniques, such as e.g. those with ultrasounds or adhesive materials.

According to one aspect, the protection element 70 is made of preferably biodegradable materials that are permeable to liquids.

In use, this protection element 70 is the element that is pierced by the tips of the machine so as to supply the extraction fluid.

An alternative embodiment of the movable membrane 62 (not shown in the accompanying figures) provides the use of a rubber element, preferably made of a disc-shaped elastomer (even NBR) having a thickness of up to 1.5 mm. This rubber element is also held in position by the protection element 70.

Figure 5:
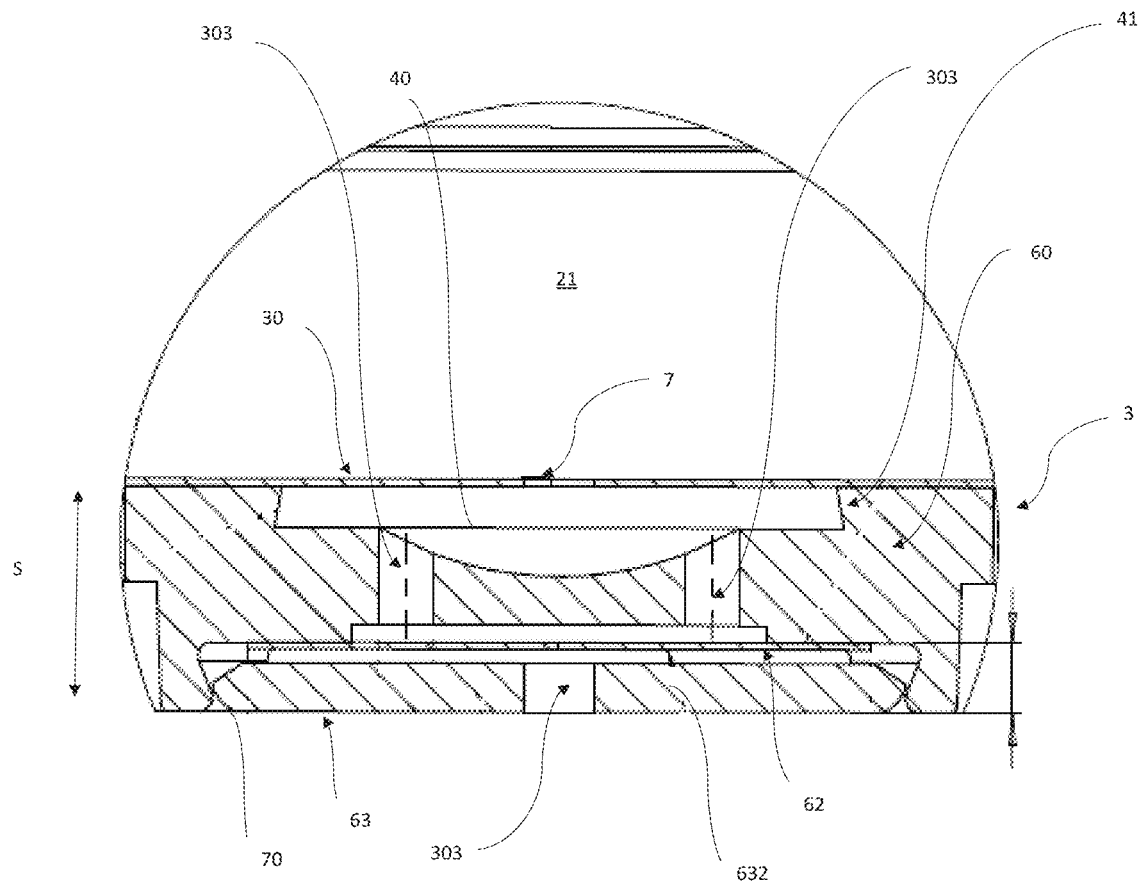
FIG. 5 shows an enlarged view of the same portion of FIG. 3 of a second embodiment of the capsule in accordance with the present invention.

In the embodiment of the degassing valve 6 shown in FIG. 5, similar for the other characteristics to the one shown in FIGS. 4A and 4B, the holding means 63 comprises a cap 632 configured to mechanically engage with the outer surface 301 of the first base 3 so as to prevent the loss of the movable membrane 62 when this latter is in the open position and to protect said degassing valve 6 from agents external to said capsule 1.

It should be noted that the embodiment of the valve of FIG. 5 does not necessarily provide for the protection element 70.

According to one aspect, the capsule 1 comprises a filter 40, which is configured to prevent the product from leaving the closed chamber 21 towards the degassing valve 6.

This filter 40 is interposed between the injection lid 30 and the degassing valve body 6.

For this purpose, the capsule 1 comprises a seat 41 formed within the thickness S of the first base 3 near the inner surface 300, which is shaped to accommodate this filter.

The filter 40 is embodied in an element made of paper, plastic and cellulose materials.

Obviously, in order to satisfy contingent and specific needs, a person skilled in the art may make numerous modifications to the variants described above, all however contained in the scope of protection as defined by the following claims.

The invention claimed is:

1. A method for preparing a liquid product from soluble or extractable products using a pressurized extraction fluid in a machine, the method comprising:

providing a capsule, comprising:

a container body defining a closed chamber housing the soluble or extractable products, the container body having a first base, a second base, and a side wall extending along a longitudinal direction between the first base and the second base, wherein the first base has a thickness;

an injection lid, sealingly associated to the container body;

a beverage dispensing lid, sealingly associated to the container body; and a degassing valve, comprising:
a valve body formed as a part of the first base, the valve body having a recess inside the thickness of the first base;
a membrane inside the recess of the valve body, wherein the membrane is movable between a first operating position, which allows passage of gases from the closed chamber to an outside of the capsule, and a second operating position, which prevents the passage of the gases and entry of the pressurized extraction fluid into the closed chamber, wherein the first operating position is allowed when reaching a predetermined gas threshold value; and
holding means that cover the recess of the valve body to prevent loss of the movable membrane;

wherein the first base, when viewed from the outside of the capsule, comprises:
a central portion; and
an annular portion surrounding the central portion;

wherein the annular portion is recessed with respect to the central portion,
wherein first openings are provided in the annular portion of the first base for passage of the pressurized extraction fluid,
wherein the injection lid has a first area covering the first openings, a second area including at least one notch putting the degassing valve in fluid communication with the closed chamber, and a third area dividing the first and second areas,
wherein the injection lid is sealed to the first base all along the third area, and
wherein the first base has second openings between the movable membrane and the third area,
inserting piercing tips of the machine into the annular portion of the first base without contacting the injection lid;
supplying the pressurized extraction fluid through the piercing tips of the machine;
using the pressurized extraction fluid to force the degassing valve to remain in a closed configuration;
using the pressurized extraction fluid to open the injection lid and only thereafter to enter the closed chamber;
producing a beverage using the pressurized extraction fluid and the soluble or extractable products; and
opening the beverage dispensing lid to release the produced beverage from the capsule;
wherein the degassing valve is designed to be actuated in an open configuration by gases released by the soluble or extractable products.

2. The method of claim 1, wherein the first base comprises:
an inner surface facing the closed chamber;
an outer surface facing the outside of the capsule; and
a first sealing region and a second sealing region, wherein the injection lid is sealed to the inner surface of the first base, and wherein the second sealing region is sealed to the third area;
wherein the second openings are provided for the passage of the gases released by the soluble or extractable products, and
wherein the first sealing region encircles the first openings of the first base, the first openings of the first base encircle the second sealing region, and the second sealing region encircles the second openings of the first base, so that the first openings are sealed by the first and second sealing regions so as to avoid any entry of air through the first openings during storage of the capsule.

3. The method of claim 2, wherein the first openings comprise a plurality of holes in a circular arrangement, and
wherein the second openings comprise a plurality of holes in a straight line arrangement.

4. The method of claim 3, wherein the first sealing region and the second sealing region are shaped in concentric circles, in which the first sealing region has a diameter larger than a diameter of the circular arrangement of the first openings and the second sealing region has a diameter larger than a length of the straight line representative of the second openings, but smaller than the diameter of the circular arrangement of the first openings.

5. The method of claim 2, wherein the second openings are provided in the central portion, and
wherein the at least one notch faces the central portion.

6. The method of claim 2, wherein the first sealing region and/or the second sealing region are obtained by heat sealing, ultrasounds, or adhesive material.

7. The method of claim 6, wherein at least a portion of the first sealing region and/or of the second sealing region yields to pressure of the pressurized extraction fluid passing through the first openings so that the injection lid is raised with respect to the first base.

8. The method of claim 2, wherein the valve body has a same thickness as the thickness of the first base, and
wherein the holding means comprises:
a cap configured to mechanically engage the outer surface of the first base to prevent the loss of the movable membrane when the movable membrane is in the first operating position and to protect the degassing valve from agents external to the capsule.

9. The method of claim 2, wherein the valve body has a same thickness as the thickness of the first base,
wherein the holding means comprises:
a protection element, which is associated to the outer surface of the first base, facing the outside of the capsule at the degassing valve; and
wherein the protection element is configured to prevent the loss of the movable membrane and to protect the degassing valve from agents external to the capsule.

10. The method of claim 2, wherein the first openings comprise a plurality of holes in a circular arrangement.

11. The method of claim 2, wherein the second openings comprise a plurality of holes, which are arranged along a straight line.

12. The method of claim 1, wherein the valve body has a same thickness as the thickness of the first base.

13. The method of claim 1, wherein the degassing valve comprises a filter, which is interposed between the injection lid and the movable membrane and is configured to avoid any leakage of the soluble or extractable products from the closed chamber toward the outside of the capsule.

14. The method of claim 1, wherein the injection lid is made of material that is heat-shrunk, torn, pierced, or dissolved when the pressurized extraction fluid is supplied through the piercing tips of the machine.

15. The method of claim 1, wherein the injection lid and the beverage dispensing lid are both a compostable barrier lid, each of the injection lid and the beverage dispensing lid comprising at least one first barrier layer and one oxygen barrier layer.

16. The method of claim 1, wherein the container body and/or the degassing valve is made of compostable material.

17. The method of claim 1, wherein the degassing valve comprises a filter between the injection lid and the movable membrane.

18. The method of claim 1, wherein the injection lid is a compostable barrier lid,
   wherein the beverage dispensing lid is a compostable barrier lid, or
   wherein the injection lid and the beverage dispensing lid are both a compostable barrier lid.

19. The method of claim 1, wherein the container body is made of biodegradable material.

20. A method for preparing a liquid product from soluble or extractable products using a pressurized extraction fluid in a machine, the method comprising:
   providing a capsule, comprising:
      a container body defining a closed chamber housing the soluble or extractable products, the container body having a first base, a second base, and a side wall extending along a longitudinal direction between the first base and the second base;
      an injection lid, sealed to the container body;
      a beverage dispensing lid, sealed to the container body; and
      a degassing valve, comprising:
         a membrane movable between a first operating position, which allows passage of gases from the closed chamber to an outside of the capsule, and a second operating position, which prevents the passage of the gases and entry of the pressurized extraction fluid into the closed chamber, wherein the first operating position is allowed when reaching a predetermined gas threshold value;
      wherein the first base has first openings for passage of the pressurized extraction fluid,
      wherein the injection lid has a first area covering the first openings, a second area including at least one notch putting the degassing valve in fluid communication with the closed chamber, and a third area dividing the first and second areas,
      wherein the injection lid is sealed to the first base all along the third area, and
      wherein the first base has second openings between the movable membrane and the third area,
   supplying the pressurized extraction fluid;
   using the pressurized extraction fluid to force the degassing valve to remain in a closed configuration;
   using the pressurized extraction fluid to open the injection lid and only thereafter to enter the closed chamber;
   producing a beverage using the pressurized extraction fluid and the soluble or extractable products; and
   opening the beverage dispensing lid to release the produced beverage from the capsule;
   wherein the degassing valve is designed to be actuated in an open configuration by gases released by the soluble or extractable products.

* * * * *